United States Patent [19]

Faulstich et al.

[11] 4,099,834
[45] Jul. 11, 1978

[54] LOW LOSS GLASS SUITABLE FOR OPTICAL FIBER

[75] Inventors: Marga Faulstich, Mainz; Norbert Neuroth, Mainz-Mombach; Franz Reitmayer, Drais; Georg Krolla, Mainz-Mombach, all of Fed. Rep. of Germany

[73] Assignee: Jenaer Glaswerk Schott & Gen., Mainz, Fed. Rep. of Germany

[21] Appl. No.: 527,152

[22] Filed: Nov. 25, 1974

[30] Foreign Application Priority Data

Nov. 30, 1973 [DE] Fed. Rep. of Germany ....... 2359657

[51] Int. Cl.² .............................................. G02B 5/14
[52] U.S. Cl. ............................. 350/96.34; 106/47 Q; 106/53
[58] Field of Search ............ 350/96 R, 96 M, 96 WG; 106/47 Q, 53, 50

[56] References Cited

U.S. PATENT DOCUMENTS 2,964,414  12/1960  Dalton et al. ............................. 106/53
3,020,165  2/1962   Davis ............................. 350/96 M X

FOREIGN PATENT DOCUMENTS 1,160,535  8/1969  United Kingdom ................... 106/50
1,224,446  3/1971  United Kingdom ................... 106/50

OTHER PUBLICATIONS

Geller et al., *Journal of Research of National Bureau of Standards*, vol. 17, Aug. 1936, Research Paper RP 911 pp. 277–289 cited.

*Primary Examiner*—John K. Corbin
*Assistant Examiner*—John D. Lee
*Attorney, Agent, or Firm*—Millen & White

[57] ABSTRACT

A glass when in the form of an optical fiber having an optical loss of not more than 150 dB/km, high transparency, a high numerical aperture, and a high flexural strength, said glass being especially suitable for optical fibers and consisting essentially of:
  $SiO_2$: 65 – 75 mol-%; (38 – 46% by weight);
  $R_2O$: 4 – 17 mol-%; (4 – 13% by weight);
  PbO: 16 – 25 mol-%; (42 – 55% by weight); wherein $R_2O$ is $Na_2O$, $K_2O$ or $Cs_2O$ or mixtures thereof, preferably not more than 3.0 mol % $Na_2O$, and with the provision that the molar ratio of $SiO_2$:PbO is 2.5 – 4.0.

21 Claims, 2 Drawing Figures

LOW LOSS GLASS SUITABLE FOR OPTICAL FIBER

This invention relates to glasses having low optical losses of below 150 dB/km, and to the manufacture therefrom of light conducting fibers having high transparency, a large numerical aperture, and a high flexural tensile strength.

In conventional optical systems (lenses, objectives, closing window), the length of path of the light beam is, in most cases, merely several centimeters. With optical fibers, on the other hand, path lengths of 10 meters have already been observed. However, for optical fibers to be used as wave guides, i.e., for the transmission of information, path lengths on the order of kilometers are of particular interest.

It is also important that in case of transmission distances of the order of kilometers, the intensity of the light beam at the end of the fiber should be of sufficient strength for purposes of detection. For example, after traversing a light conducting fiber having a length of 2 km, the light intensity should still be at least 1% of the intensity at the inlet of the fiber.

In communications technology, the transmission loss (= attenuation) is indicated in decibels per kilometer. This unit is calculated from a transmission measurement as follows:

If the intensity of the light in the fiber is $I_o$ at the beginning and $I_e$ at the end, the transmission $\theta$ thereof is:

$$\theta = I_e/I_o$$

If the length of the fiber is L kilometers, the loss can be calculated as follows:

$$D = (10/L) \lg 1/\theta \text{ dB/km.}$$

The total light loss of the glass is there composed of the absorption loss and the scattering loss.

The absorption of the glass is caused by:
(a) the individual absorption of the single glass components;
(b) contamination by coloring oxides (transition elements and OH-ions);
(c) the melting conditions which affect, for example, the degree of oxidation.

The scattering in the glass depends on the inhomogeneities caused by the microstructure of the glass or by the melting conditions.

Additionally, scattering losses occur in the light conducting fiber at the melt boundary surfaces between the core glass and the sheath glass.

Under conventional melting conditions, with the use of commercial raw materials as utilized for optical glasses, losses of at best 2,000–200 dB/km are attained in the spectral range around $\lambda = 850$ nm, and in case of $SiO_2$ glass, these losses are 50–10 dB/km.

To produce an optical fiber, two glasses are required for core and sheath respectively, the refractive indices of which differ by one or several percent. This glass composite should result in a sheathed fiber having a satisfactory mechanical strength, i.e., the fiber must be capable of being bent to a great extent without light emanating from the fiber core and without the fiber being fractured.

In recent times, it has been made possible to produce, with the use of extremely pure raw materials and under scrupulously controlled melting conditions, an $SiO_2$ glass which, in the wavelength range around 850 nm, has losses of only several dB/km. Under the same conditions of extreme purity, it was possible to obtain $SiO_2$-alkali oxide-calcium oxide glasses having losses of $\approx 40$ dB/km. (See PINNOW, D. A., et al, "FUNDAMENTAL OPTICAL ATTENUATION LIMITS IN THE LIQUID AND GLASSY STATE WITH APPLICATION TO FIBER OPTICAL WAVEGUIDE MATERIALS," Appl. Phys. Lett. 22, 1973, 527.)

Pure quartz glass has a very low index of refraction and a low thermal expansion. In order to produce optical fibers, this glass must be doped with oxides which increase the refractive index, and this material must be used for the fiber core. This fiber manufacturing process has two disadvantages:

1. In most cases, if it is desired that the optical losses should be low, only minor differences in the refractive index can be obtained.

2. For melting the pure quartz glass and the doped quartz glass, very high temperatures must be employed.

Although it would be possible to produce light conducting fibers with the aforementioned $SiO_2$-alkali oxide-calcium oxide glasses of maximum purity, the range of the refractive index differences between the core glass and the sheath glass, and thus the numerical aperture of the fiber, would be limited.

SUMMARY OF THE INVENTION

In view of the above recited problems, it is an object of the present invention to provide new glasses and processes for producing same, said glasses being suitable, in particular, for the production of optical fibers and exhibiting the following properties:
(a) extremely low optical losses;
(b) high flexural tensile strength;
(c) a broad refractive index range;
(d) low manufacturing temperatures.

Another object is to provide optical fibers based on these new fibers.

Upon further study of the specification and appended claims, the objects and advantages will become apparent.

The glasses have the following composition:
$SiO_2$: 65–75 mol-%;
$R_2O$: 4–17 mol-%;
$PbO$: 16–25 mol-%;
wherein the molar ratio of $SiO_2$: $PbO$ is between 2.5 and 4.0, and R represents an alkali metal.

Especially low transmission losses are provided by those glasses of the present invention which contain little or no $Na_2O$, but in place thereof $K_2O$ and/or $Cs_2O$. By little $Na_2O$ is meant not more than about 3.0, preferably not more than about 2.5 molar percent $Na_2O$.

The glasses of this invention have a low concentration of coloring and scattering centers and therefore show low optical losses in the short-wave infrared spectral range.

It has been found that the lowest optical losses (up to about 80 dB/km) can be attained if the glasses of this invention consist essentially of the following components:

| Oxides | In Molar Percent |
|---|---|
| $SiO_2$ | 65 – 75 |
| $K_2O$ | 4 – 17, especially 4–12 |
| $Cs_2O$ | 0 – 5 |
| $PbO$ | 16 – 25 |
| | In Percent by |

-continued

| Oxides | In Molar Percent |
|---|---|
| | Weight |
| $SiO_2$ | 38 – 48 |
| $K_2O$ | 4 – 13, especially 4 – 12 |
| $Cs_2O$ | 0 – 10 |
| PbO | 42 – 55 | with the provision that the ratio of $SiO_2$ : PbO in molar percent is 2.5–4.0.

The production of these glasses is accomplished with the use of commercial optical raw materials and requires no extreme purity conditions during melting. The losses (dB/km) at a wavelength around 850 nm in these optical glasses can be reduced, with the use of extremely pure raw materials and under extreme purity conditions during melting to not more than 20 dB/km. For producing such extreme purity conditions, reference is made to the aforementioned PINNOW article.

The $H_2O$ content of the glasses is preferably below 10 p.p.m.

The advantages displayed by optical fibers manufactured from the $SiO_2$ - $R_2O$ - PbO glasses of this invention are the following:

1. Glass composites for sheathed optical fibers can be produced with the glasses of this invention, making it possible to bend the fibers relatively severely without light escaping therefrom.

2. The difference of the coefficients of expansion can be set so that compressive stresses occur in the sheath glass, so that the fiber can be severely bent without breaking.

3. The difference in the indices of refraction between the core glass and the sheath glass can be set at a relatively large value, so that high values in turn are obtained for the numerical aperture of the fiber characterized by the relationship $$\sin \alpha_o = \sqrt{n_1^2 - n_2^2}.$$

4. The melting temperatures of these glasses and the fiber-drawing temperatures are considerably lower than, for example, in case of quartz glass, the latter being in the range, for example, of 2300° to 2500° C. for the melting temperature and 1800° to 2100° C. for the fiber drawing temperatures. Compared to this the melting temperatures of the glasses of the invention are in the range of, for example, 1300°–1360° C., and their fiber drawing temperatures are in the range, for example, of 800°–900° C.

The glasses of the invention can be drawn by conventional fiber drawing techniques to low loss optical fibers having diameters, for example, in the range of 40 to 150 μm, the core having a diameter of, for example, 30 to 100 μm, and the sheath having a diameter of, for example, 20 to 100 μm. The refractive index of the core may, for example, be 1.644, and of the sheath, for example, 1.604. The flexural strength of these fibers are, for example, about 30 kp/mm².

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Table 1 tabulates, in Examples 1 through 12, compositions according to this invention on a mol % basis.

Table 2 tabulates the same examples, but on a weight percent basis.

TABLE 1

Figure 1:
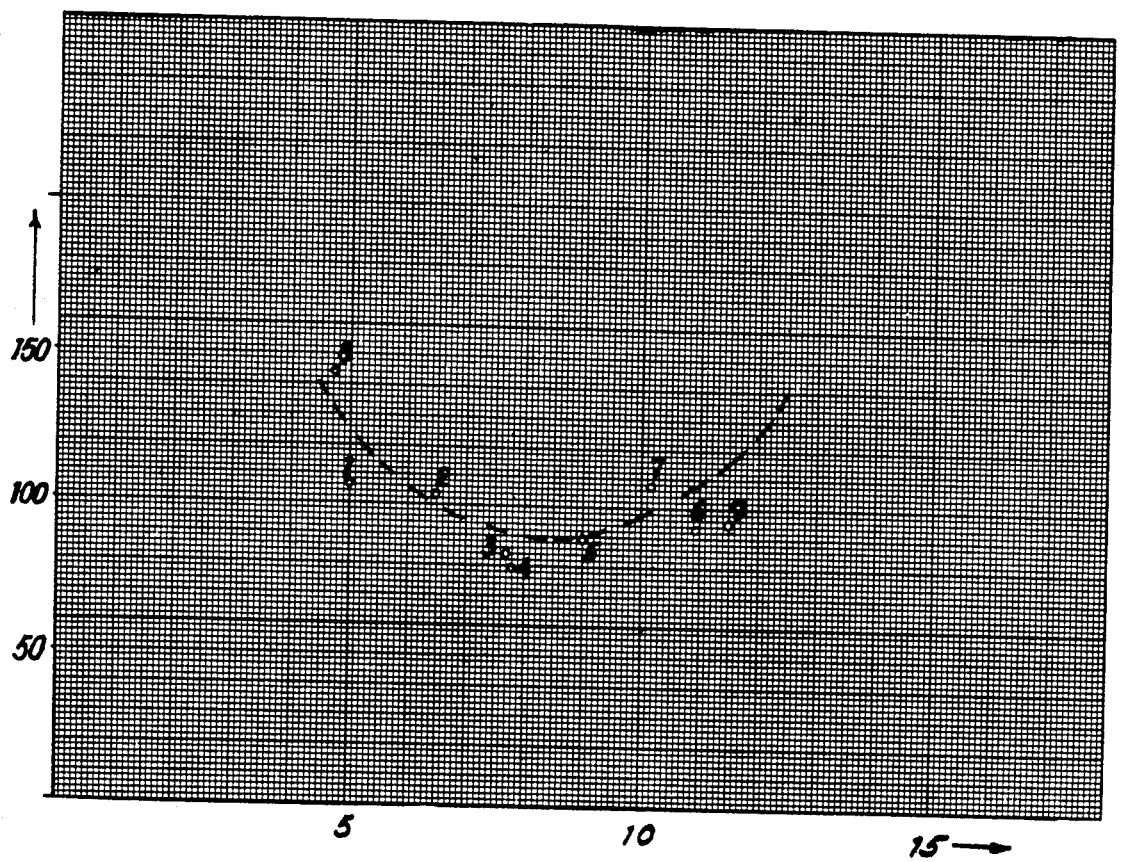
FIG. 1 represents the dependency of the optical losses at a wavelength $\lambda$ = 850 nm on the $K_2O$ content in mol-%. The abscissa represents $K_2O$ content in mol % and the ordinate optical loss in dB/km.
Figure 2:
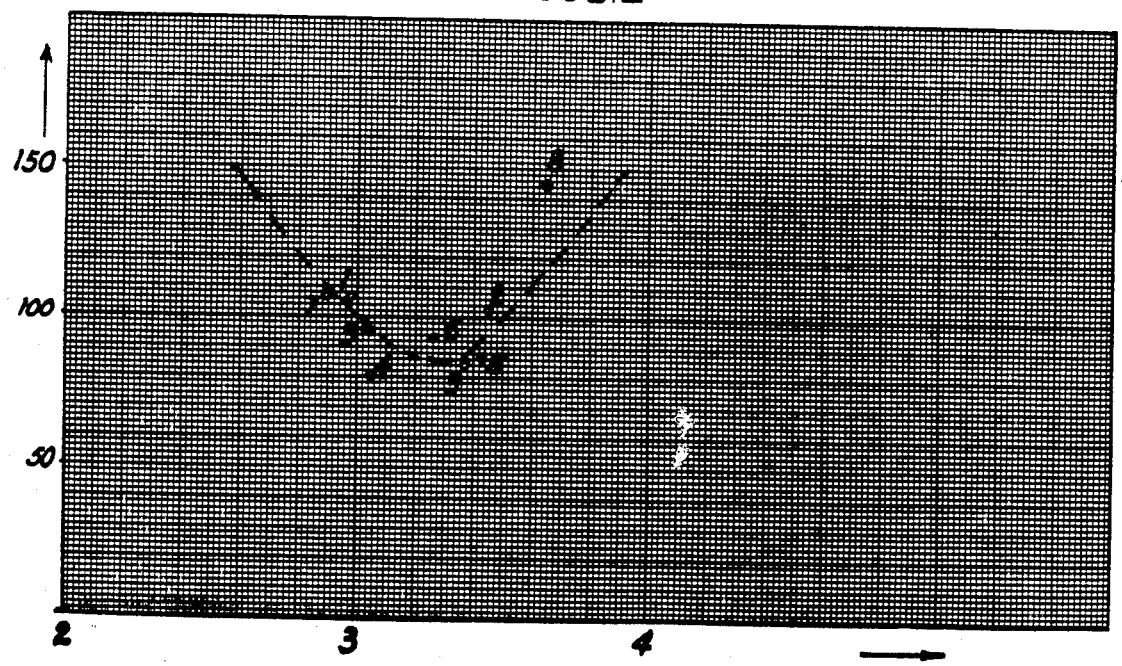
FIG. 2 is similar to FIG. 1 wherein the abscissa represents the mol % ratio of $SiO_2$ : PbO, showing that a ratio of 2.5–4.0 also yields optical losses below 150 dB/km.

| OXIDES | MOL-% | | | | | |
|---|---|---|---|---|---|---|
| | 1 | 2 | 3 | 4 | 5 | 6 |
| $SiO_2$ | 71.0 | 72.5 | 71.19 | 69.40 | 70.5 | 67.91 |
| $Na_2O$ | — | — | — | — | — | — |
| $K_2O$ | 5.0 | 6.5 | 7.70 | 7.87 | 9.0 | 10.96 |
| $Cs_2O$ | — | — | — | — | — | — |
| PbO | 24.0 | 21.0 | 21.10 | 22.72 | 20.5 | 21.13 |
| $SiO_2$/PbO | 2.96 | 3.45 | 3.37 | 3.06 | 3.42 | 3.28 |
| dB/km at $\lambda$ 850 nm | 107 | 102 | 84 | 80 | 87 | 93 |
| $n_d$ | 1.6477 | 1.6283 | 1.6347 | 1.6478 | 1.6293 | 1.6322 |
| $\alpha \cdot 10^7$/° C. 20–300° C. | 79.6 | 81 | 88.3 | 85.7 | 89.5 | 95.7 |
| Tg ° C. | 466 | 475 | 466 | 462 | 468 | 460 |
| EW ° C. | | 650 | 631 | 629 | 632 | 625 |

| OXIDES | 7 | 8 | 9 | 10 | 11 | 12 |
|---|---|---|---|---|---|---|
| $SiO_2$ | 66.87 | 74.83 | 66.5 | 70.1 | 69.0 | 71.2 |
| $Na_2O$ | — | — | — | 2.4 | 1.6 | — |
| $K_2O$ | 10.13 | 4.74 | 11.5 | 5.7 | 6.8 | 5.0 |
| $Cs_2O$ | — | — | — | — | — | 2.7 |
| PbO | 23.00 | 20.43 | 22.0 | 21.8 | 22.6 | 21.2 |
| $SiO_2$/PbO | 2.90 | 3.66 | 3.02 | 3.2 | 3.05 | 3.37 |
| dB/km at $\lambda$ 850 nm | 107 | 145 | 96 | 130 | 110 | 128 |
| $n_d$ | 1.64911 | 1.6170 | 1.6450 | 1.6398 | 1.6461 | 1.63310 |
| $\alpha \cdot 10^7$/° C. 20–300° C. | | 70.1 | 104.9 | 89 | 93 | 82.1 |
| Tg ° C. | | 484 | 439 | 448 | 443 | 472 |
| EW ° C. | | 674 | | 614 | 604 | |

$\alpha \cdot 10^7$/° C. = Expansion coefficient in the temperature range of 20 – 300° C. 20–300° C.
Tg ° C. = Transformation temperature
EW ° C. = Temperature at $10^{7.65}$ poises

TABLE 2

| OXIDES | % BY WEIGHT | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 42.2 | 45.10 | 43.6 | 41.60 | 43.84 | 41.50 | 39.60 | 47.3 | 45.8 | 43.4 | 41.8 | 41.85 |
| $Na_2O$ | — | — | — | — | — | — | — | — | — | 1.5 | 1.0 | — |
| $K_2O$ | 4.7 | 6.34 | 7.4 | 7.40 | 8.80 | 10.50 | 9.40 | 4.7 | 11.1 | 4.7 | 6.4 | 4.61 |
| $Cs_2O$ | — | — | — | — | — | — | — | — | — | — | — | 7.44 |
| PbO | 53.1 | 48.56 | 48.0 | 50.60 | 47.36 | 48.00 | 50.60 | 48.0 | 43.1 | 50.4 | 50.8 | 46.10 |

Exemplary of the production of these glasses as applied to Example 4 is the following procedure:

The following blend for a 4-liter melt is produced from maximum purity raw materials (metal contaminants < p.p.m.) and thoroughly mixed: (The preceding parenthetical expression means that there is less than 1 part per million of metal contamination.)

| Oxides | Mol-% | % by Wt. | Raw Materials | Originally Weighed-In Quantity kg |
|---|---|---|---|---|
| $SiO_2$ | 69.40 | 41.72 | $SiO_2$ | 6.458 |
| $K_2O$ | 7.87 | 7.42 | $K_2CO_3$ | 1.685 |
| PbO | 22.72 | 50.76 | PbO | 7.858 |
| *$As_2O_3$ | 0.05 | 0.10 | $As_2O_3$ | 0.016 |

*Arsenic oxide is preferably employed as a refining agent

The blend is melted in a pure, ceramic crucible at 1300° C. Thereafter, the melt is stirred as a finishing step at 1060° C, allowed to stand for about 3–5 hours, and drawn into rods at 1060° C. The rods are homogeneous and free of bubbles. This glass may be used for manufacturing cores of low loss optical fibers having a refractive index of 1.6440 and having optical losses of about 15 dB/km.

To make a sheath glass the following blend for a 4-liter melt is produced from maximum purity raw materials (metal contaminants < p.p.m.) and thoroughly mixed:

| Oxides | Mol-% | % by Wt. | Raw Materials | Originally Weighed-in Quantity kg |
|---|---|---|---|---|
| $SiO_2$ | 74.4 | 48.6 | $SiO_2$ | 6.887 |
| $K_2O$ | 7.6 | 7.7 | $K_2CO_3$ | 1.604 |
| PbO | 18.0 | 43.7 | PbO | 6.205 |
| $As_2O_3$* | 0.05 | 0.1 | $As_2O_3$ | 0.014 |

*Arsenic oxide is a refining agent.

The blend is melted in a pure, ceramic crucible at 1300° to 1360° C. Thereafter, the melt is stirred as a finishing step at 1150° C, allowed to stand for about 3–5 hours, and drawn into rods at 1150° C. The rods are homogeneous and free of bubbles.

This glass may be used to produce sheaths for low loss optical fibers having a refractive index of 1.6040 and having optical losses of about 20 dB/km.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An optical fiber having an optical loss of not more than 150 dB/km, high transparency, and a high flexural strength, said optical fiber comprising a sheath and core, at least one of said sheath and core being a glass of a composition consisting essentially of:
   $SiO_2$: 65–75 mol-% (38–46% by weight);
   $R_2O$: 4–17 mol-% (4–13% by weight);
   PbO: 16–25 mol-% (42–55% by weight);
   wherein $R_2O$ is $Na_2O$, $K_2O$ or $Cs_2O$ or mixtures thereof and with the provision that the molar ratio of $SiO_2$: PbO is 2.5–4.0.

2. An optical fiber according to claim 1 having an optical loss of not more than about 80 dB/km, said composition consisting essentially of:
   $SiO_2$: 65–75 mol-% (38–48% by weight);
   $K_2O$: 4–17 mol-% (4–13% by weight);
   $Cs_2O$: 0–5 mol-% (0–10% by weight);
   PbO: 16–25 mol-% (42–55% by weight).

3. An optical fiber according to claim 2, said composition containing 4–12 molar percent $K_2O$.

4. An optical fiber according to claim 3, said composition containing less than 1 p.p.m. of metal contaminants.

5. An optical fiber according to claim 2, said composition containing less than 10 p.p.m. $H_2O$.

6. An optical fiber according to claim 5, said composition containing less than 1 p.p.m. of metal contaminants.

7. An optical fiber according to claim 2, said composition containing less than 1 p.p.m. of metal contaminants.

8. An optical fiber according to claim 7 wherein both the sheath and the core have a composition according to claim 7, but wherein the composition of the sheath and core differ and the refractive indices thereof differ.

9. An optical fiber according to claim 1, said composition consisting essentially of:
   $SiO_2$: 70.5 mol-% (43.8% by weight);
   $K_2O$: 9.0 mol-% (8.8% by weight);
   PbO: 20.5 mol-% (47.4% by weight);
   the molar ratio $SiO_2$/PbO being 3.45.

10. An optical fiber according to claim 9, said composition containing less than 1 p.p.m. of metal contaminants.

11. An optical fiber according to claim 1, said composition consisting essentially of:
    $SiO_2$: 69.40 mol-% (41.76% by weights);
    $K_2O$: 7.87 mol-% (7.43% by weight);
    PbO: 22.72 mol-% (50.81% by weight);
    the molar ratio $SiO_2$/PbO being 3.06.

12. An optical fiber according to claim 1 with the provision that the $H_2O$ content of said composition is < 10 p.p.m.

13. An optical fiber according to claim 12, said composition containing less than 1 p.p.m. of metal contaminants.

14. An optical fiber according to claim 1, said glass having an optical loss of not more than 20 dB/km.

15. An optical fiber according to claim 1, wherein both the sheath and the core have said composition according to claim 1, but wherein the composition of the sheath and core differ and the refractive indices thereof differ.

16. In a process of transmitting information through an optical waveguide comprising sending modulated light into one end of the waveguide and detecting the light at the other end of the waveguide, the improvement wherein said waveguide is an optical fiber according to claim 15.

17. In a process of transmitting information through an optical waveguide comprising sending modulated light into one end of the waveguide and detecting the light at the other end of the waveguide, the improvement wherein said waveguide is an optical fiber according to claim 1.

18. An optical fiber according to claim 1 said composition having not more than 3.0 molar percent $Na_2O$.

19. An optical fiber according to claim 18, said composition containing less than 1 p.p.m. of metal contaminants.

20. An optical fiber according to claim 1, said composition containing less than 1 p.p.m. of metal contaminants.

21. An optical fiber according to claim 6 wherein both the sheath and the core have a composition according to claim 20, but wherein the composition of the sheath and core differ and the refractive indices thereof differ.

* * * * *